United States Patent Office 3,321,350
Patented May 23, 1967

3,321,350
ORGANOFUNCTIONAL SILANE-HYDROLYZABLE
TITANATE PRIMER COMPOSITIONS
Frank Fekete, Monroeville, Pa., assignor to Union Carbide Corporation, a corporation of New York
No Drawing. Filed Feb. 19, 1962, Ser. No. 174,274
16 Claims. (Cl. 156—329)

This invention relates to primer compositions for promoting the adhesion of cured diorganopolysiloxane elastomers to the surfaces of solid materials. More particularly, the invention is directed to primer compositions which comprise a mixture of an organofunctional silane and a hydrolyzable titanium compound.

Cured polysiloxane elastomers exhibit a characteristic lack of adhesiveness toward the surfaces of solid materials. Heretofore, in order to provide a polysiloxane elastomer in bonded relation to a solid material it was necessary to contact the uncured elastomer formulation with the solid surface and thereafter carry out the curing of elastomer while maintaining such contact. This procedure was subject to several disadvantages including the necessity of maintaining the contact between the uncured elastomer and the solid surface by means of clamps or other method of applying pressure and the necessity of using a relatively high temperature in the order of 480° F. or above to effect heat curing of the elastomer. Thus, this method can not be used where the solid material would be damaged by temperatures higher than about 150°–200° F.

Heretofore it was possible to obtain some adhesion of cured siloxane elastomers to solid surfaces by applying to the surface a bonding agent (such as an epoxy resin or dimethyldichlorosilane) which possesses a mutual affinity for both the elastomer and the solid material, contacting the elastomer with the treated surface, then maintaining contact between the siloxane elastomer and the primed solid surface by means of external pressure and heating this combination to a relatively high temperature in the order of 480° F. and above. Although some degree to adhesion can be obtained by this method the elastomer and the solid material can be manually stripped apart.

Accordingly, it is an object of this invention to provide a method for promoting the adhesion of cured polysiloxane elastomers to solid surfaces.

Another object of this invention is to provide a primer composition which when applied to the surfaces of a solid material will promote strong adhesion of a cured polysiloxane elastomer to such solid.

Another object of this invention is to provide a method for bonding a cured polysiloxane elastomer to a solid surface without requiring the application of external pressure.

Still another object of this invention is to provide a method for bonding a cured polysiloxane elastomer to a solid surface at moderate temperatures in the range of 150° F. to 480° F.

The silanes useful in the primer compositions of this invention are organosilanes in which at least one of the organic moieties bonded to the silicon atom contains a functional group. Illustrative classes of organofunctional silanes useful in the primer compositions of this invention can be represented by the formula:

(a) $$H_2NC_bH_{2b}Si(OR')_{3-n}R_n$$

wherein R is a monovalent hydrocarbon group, R' is an alkyl group, b is an integer having a value from 3 to 6, n is an integer having a value from zero to 1, and the amino group is separated from the silicon atom by at least three carbon atoms of the $C_bH_{2b}$ group:

(b) $$NCC_dH_{2d}Si(OR')_{3-n}R_n$$

wherein R, R' and n have the meanings defined with reference to formula (a) above, d is an integer having a value from 2 to 5, and the cyano group is separated from the silicon atom by at least two carbon atoms of the $C_dH_{2d}$ group:

(c) $$R'O\overset{O}{\overset{\|}{C}}-C_dH_{2d}Si(OR')_{3-n}R_n$$

wherein R, R', n and d have the meanings defined with reference to formula (b) above, and the carboalkoxy group $$R'O\overset{O}{\overset{\|}{C}}-$$

is separated from the silicon atom by at least two carbon atoms of the $C_dH_{2d}$ group:

(d) $$CH_2=CHC_eH_{2e}Si(OR')_{3-n}R_n$$

wherein R, R' and n have the meanings defined with reference to formula (a) above, and e is an integer having a value from zero to 4; and (e) $$H_2NC_fH_{2f}\overset{H}{N}C_bH_{2b}Si(OR')_{3-n}R_n$$

wherein R, R', b and n have the meanings defined with reference to formula (a) above, f is an integer having a value from 2 to 6 and the secondary amine group is separated from the silicon atom by at least three carbon atoms of the $C_bH_{2b}$ group.

The R group in formulas (a) through (e) includes alkyl, cycloalkyl, aryl, alkaryl, aralkyl, alkenyl and cycloalkenyl groups and preferably contains from one to about 12 carbon atoms. The R' group in formulas (a) through (e) preferably contains from one to about four carbon atoms.

Illustrative of the groups that R can represent are the methyl, ethyl, isooctyl, tertiary-butyl, dodecyl, cyclopentyl, cyclohexyl, phenyl, naphthyl, tolyl, xylyl, benzyl, beta-phenylethyl, vinyl, allyl, hexenyl, cyclohexenyl, cycloheptenyl and the like.

Illustrative of the groups that R' can represent are methyl, ethyl, iso-propyl, butyl, tertiary-butyl and the like.

The following are illustrative of the silanes useful in this invention:

gamma-aminopropyltriethoxysilane
delta-aminobutylmethyldiethoxysilane
gamma-aminoisobutyltrimethoxysilane
epsilon-aminopentylphenyldibutoxysilane
beta-cyanoethyltriethoxysilane
gamma-cyanopropylmethyldiethoxysilane
beta-cyanoethylphenyldimethoxysilane
delta-cyanobutylcyclohexyldiethoxysilane
beta-carbethoxyethyltriethoxysilane
gamma-carbomethoxypropylmethyldiethoxysilane
beta-carbobutoxyethyltrimethoxysilane
delta-carbethoxybutylethyldiisopropoxysilane
vinyltriethoxysilane
allyltrimethoxysilane
hexenylmethyldiethoxysilane
allylbenzyldiethoxysilane
N(beta-aminoethyl)-gamma-aminopropyltrimethoxysilane
N(gamma-aminopropyl)-gamma-aminoisobutylmethyldiethoxysilane The hydrolyzable titanium-containing compounds useful in the primer compositions of this invention include titanium esters, titanium chelates and titanium salts of organic acids. In the esters and organic acid salts, the titanium atom is bonded to monodentate organic groups (that is, only one linkage connects the titanium atom to each organic moiety) while in the chelates the titanium atom is bonded to at least one multidentate organic group (that is, the organic moiety is bonded to the titanium through more than one linkage). Such compounds can be employed in the primers of this invention either individually or in any suitable combination. Illustrative examples of titanium esters which can be employed include titanium ortho esters (that is, esters where each titanium atom is bonded through titanium-oxygen-carbon bonds to four monodentate hydrocarbon groups derived from alcohols) such as tetraisopropyl titanate, tetra-n-butyl titanate, tetra-2-ethylhexyl titanate, tetramethyl titanate, tetradodecyl titanate, tetrabenzyl titanate, tetrastearyl titanate and the like, mixed titanium ortho esters such as diisopropyl-di-n-butyl titanate, diisopropyl-di-2-ethylhexyl titanate, diisopropyl-distearyl titanate and the like, and the polymers of such compounds. Among the titanium chelates which can be employed can be mentioned octyleneglycol titanates such as tetraoctyleneglycol titanate, triethanolamine titanates such as tetra-triethanolamine titanate, nitrogen salts of triethanolamine titanates such as triethanolamine titanate-N-oleates and triethanolamine-N-stearates, titanium lactates, and titanium acetylacetones. Suitable organic acid titanium salts include such compounds as titanium stearates, titanium oleates, titanium acetates and the like. Mixed titanium-containing compounds, such as a mixed titanium ester and salt, for example isopropoxy titanium stearates and isopropoxy titanium oleates, and the polymers of such compounds, and chelated titanium esters such as octyleneglycolbutanol titanates and triethanolaminepropanol titanates, and the polymers of such compounds, can also be employed. The titanium-containing compounds employed in the primer compositions of this invention can, of course, contain nonhydrolyzable organic groups in addition to the hydrolyzable groups present, as, for example, in phenyltitanium triacetate and dibutyl titanium diisopropoxide.

The preferred monomeric titanium-containing compounds employed in the primer compositions of this invention can be depicted by the formula $R_mTi(OR^*)_{4-m}$, wherein R has the meaning defined with reference to Formula (a) hereinabove, R* represents a hydrogen atom, an R group or an

group, and $m$ is an integer having a value of from 0 to 3. Preferably R contains from 1 to about 12 carbon atoms and $m$ is an integer having a value of from 0 to 2 inclusive. The compounds most preferred are titanium ortho esters, $Ti(OR'')_4$, where R'' is an alkyl group containing from 1 to about 12 carbon atoms. For example, R'' can be methyl, isopropyl, tertiary butyl, isooctyl, dodecyl and the like.

The polysiloxane elastomers which can be bonded to solid material by the use of the primer compositions of this invention include any polysiloxane elastomers prepared by heat-curing a formulation comprising at least (1) a diorganopolysiloxane gum, (2) an inorganic or carbon black filler, and (3) a curing catalyst. The elastomer formulation can also contain one or more additional ingredients such as organosilicon compounds containing silicon-bonded hydroxy groups, organosilicon compounds containing silicon-bonded alkoxy groups and boron-containing compounds.

Cured polysiloxane elastomers derived from formulations containing a diorganopolysiloxane gum, a filler and a curing catalyst are well known in the art. Cured polysiloxane elastomers derived from formulations which contain one or more alkoxy-containing silicon compounds, hydroxy containing silicon compounds and boron-containing compounds are described in detail in my United States Patent 2,954,357 and my United States patent application Ser. No. 88,019 filed Feb. 9, 1961. My aforemention United States patent and patent application also describe typical diorganopolysiloxane gums, fillers, curing catalysts, alkoxy-containing silicon compounds, hydroxy-containing silicon compounds, boron-containing compounds and methods for preparing polysiloxane elastomer formulations and for producing cured elastomers from such formulations.

The solid materials to which cured polysiloxane elastomers can be adhered by means of the primer compositions of this invention including all known natural and synthetic solid materials useful as standard materials of construction and fabrication. Illustrative of this wide variety of solid materials are metals and metal alloys, such as steel, phosphatized steel, aluminum anodized aluminum, copper, tin, brass, bronze, and the like; siliceous materials, such as glass cloth, ceramics, porcelain, and the like; organic fibers, such as wool, cotton, and the like; and any of the various synthetic organic fibers, such as nylon, Dacron, and the like; cellulosic materials, such as wood, paper, cellophane, cellulose acetate, cellulose butyrate, ethyl cellulose, butyl cellulose, and the like; organic elastomers, such as natural rubber, chloroprene, neoprene, butadiene-styrene copolymers, acrylonitrile-butadiene copolymers, and the like; polymeric substances including addition-type polymers, such as polyethylene, polypropylene, polyvinyl chloride, polyvinylidene chloride, polyvinyl acetate, polyacrylonitrile, polymeric methyl methacrylate, and the like; the various copolymers of such materials; and condensation-type polymers, such as the solid reaction products of hexamethylenediamine with dibasic acids such as adipic acid and sebacic acid, the solution reaction products of methyl terephthalate and ethylene glycol and the polycondensation of caprolactam, and the like.

The composite articles which result from bonding a polysiloxane elastomer to a solid material by means of the primer compositions of this invention can exist in a wide variety of forms, for example, slabs, rods, sheets, strips, ducts, and the like, and such composite articles are useful as gaskets, tapes, diaphragms, conveyor belts, conduits, and the like.

The primer compositions of this invention comprise a mixture of from 25 to 90 volume percent of one or more of the silanes represented by formulas (a) through (e) hereinabove, and from 75 to 10 volume percent of one or more of the hydrolyzable titanium compounds described hereinabove, based on 100 volume percent of the mixture. It will be apparent that as the amount of silane increases from 25 to 90 volume percent, the amount of titanium compound decreases correspondingly from 75 to 10 volume percent. Preferably the primer compositions contain 40 to 80 volume percent of the silane or silane mixture and from 60 to 20 volume percent of titanium compound or mixture of titanium compounds. The primer compositions are prepared by mixing together one or more siloxanes and one or more hydrolyzable titanium compounds by any suitable procedure such as stirring, or agitating in a suitable vessel. Mixing of the compounds can be promoted by heating at temperatures up to about 100° F. but satisfactory mixing can be obtained at temperatures of about 70° F.

The mixtures so prepared can be applied as such to the solid surfaces or they can be dissolved in a liquid organic solvent. The use of a solvent in the primer compositions is particularly desirable when the solid material to which the cured polysiloxane elastomer is to be bonded is a fabric such as a glass fiber cloth. The amount of solvent employed is not critical and can vary over wide limits and any inert organic solvent in which the primer composition is soluble can be employed. The term "inert" is understood to mean that the solvent is not reactive with the silane or the titanium compound.

Suitable solvents include aliphatic hydrocarbons such as petroleum ether, cyclohexane, heptanes and the like; aromatic hydrocarbons such as benzene, toluene, xylene, and the like; alkanols such as methanol, ethanol, butanol and the like; and ethers such as diethyl ether, dibutyl ether, tetrahydrofuran, dioxane, ethylene gylcol, dimethyl ether, and the like.

The primer composition comprising the mixture of silanes and titanium compounds can be stored for periods up to 3 to 4 months without losing effectiveness. If stored for longer periods, the composition is converted to a gel-like polymer which is not satisfactory for use as a primer. The gelation is believed to result from hydrolysis of the compound due to exposure in the air and to reaction between the silanes and the titanium compounds.

When the primer composition of this invention is dissolved in an organic solvent, the primer composition solution can be stored for periods up to six months or longer without losing its effectiveness.

The process of this invention for bonding cured polysiloxane elastomers to solid materials comprises the steps of: (1) applying the primer composition to the surface of the solid material; (2) contacting the cured elastomer with the primed surface and; (3) heating the solid material-elastomer combination at a temperature of at least about 150° F. until the elastomer becomes bonded to the primed surface. Preferably the solid material-elastomer combination is heated at 150° F. to 400° F. for from about 5 minutes to about 2 hours.

The primer composition, whether or not dissolved in an organic solvent, can be applied to the surfaces of the solid material by any conventional method such as brushing, spraying, wiping with a primer saturated cloth or immersing the solid surface in the primer composition or solution of the primer composition. The thickness of the primer coating is not critical and the coatings range from very thin, invisible films to coatings up to one mil thick or greater.

The cured elastomer can be contacted immediately with the primed solid surface; however, it is preferable to wipe off any excess primed composition and allow the primed surface to air dry at room temperature for five minutes or longer before bringing the cured elastomer into contact with the primed surface. When the primer composition is dissolved in an organic solvent, it is preferable to allow the solvent to evaporate from the surface before contacting the elastomer with the primed surface.

The cured elastomer can be brought into contact with the primed surface by any conventional method and in practice the application of finger pressure has proved satisfactory. It is an unexpected advantage of the use of the primer composition of this invention that the cured elastomer can be adhered to the primed solid surface through the use of finger pressure alone and that no external pressure is required to maintain contact during the heating step.

The heating step can be carried out by a conventional procedure such as heating the solid material-elastomer combination in an oven or by applying a stream of hot air or other hot gas to the combination.

After the heating step, the cured elastomer adheres strongly to the surface of the solid material, in many instances so strongly that the solid and elastomer can not be pulled apart without damage to the elastomer.

The following examples are illustrative of the present invention. To facilitate reference, the cured polysiloxane elastomers employed in these examples are designated Elastomer I through Elastomer IV.

Elastomer I was prepared by heat curing a formulation comprising 100 parts by weight of a dimethylpolysiloxane gum containing less than 1 weight percent vinylmethylsiloxy units, 45 percent by weight silicia filler and a peroxide curing catalyst.

Elastomer II was prepared by heat curing a formulation comprising 100 parts by weight of dimethylsiloxane gum containing less than 1 weight percent vinylmethylsiloxy units, 11 parts by weight of an ethoxy end-blocked dimethylsiloxane oil, 37 parts filler (comprising silicia as the major component and barium zirconate and ferric oxide as minor components) and a peroxide curing catalyst.

Elastomer III was prepared by heat curing a formulation comprising 100 parts by weight of dimethylpolysiloxane gum containing less than 1 weight percent vinylmethylsiloxy units, 13 parts by weight of an ethoxy end-blocked dimethylpolysiloxane oil, 44 parts by weight filler (comprising silica as the major component and barium zirconate and ferric oxide as minor components) and a peroxide curing catalyst.

Elastomer IV was prepared by heat curing a formulation comprising 100 parts by weight of a dimethylpolysiloxane gum containing less than 1 weight percent vinylmethylsiloxy units, 1 part by weight diphenyldiethoxysilane, 0.5 parts by weight boric acid, 32 parts by weight filler (comprising silica as a major component and barium zirconate and ferric oxide as minor components) and a peroxide curing catalyst.

EXAMPLE 1

The following primer compositions were prepared by mixing the components and shaking vigorously in a glass vessel to give a homogeneous mixture.

Primer composition: Vol. percent
- A (control)—tetra-isoproply titanate _____ 100
- B (control)—allyltriethoxysilane _____ 100
- C (control)—gamma-carbethoxypropyl triethoxysilane _____ 100
- D—Tetra-isopropyl titanate _____ 50
  Allyltriethoxysilane _____ 50
- E—Tetra-isopropyl titanate _____ 50
  Gamma-carbethoxypropyl-triethoxysilane _ 50

Five strips of aluminum were treated with primer compositions A through E, respectively, by wiping the aluminum surface with a cloth saturated with the primer composition and then wiping the surface dry with a soft, dry cloth. A strip of Elastomer IV about 1-2 mm. thick was manually pressed onto each primed aluminum strip and the resulting composite articles were heated at 275° F. for two hours. The strength of the adhesive bonds between the elastomer and the aluminum surfaces was then measured qualitatively by the relative difficulty of manually stripping away the elastomer. (This same qualitative method of evaluating adhesive bonds was used in all the illustrative examples hereinbelow.) On this basis, the bond obtained with primed D and E was excellent, with primers B and C was fair to good, and with primer A was poor.

A portion of each of the above composite articles was then heated an additional seventeen hours at 480° F. After such prolonged heating the adhesive bond obtained with primers D and E remained excellent, while the bonds obtained with primers A, B and C were merely good.

EXAMPLE 2

Following the procedures of Example 1, rectangular pieces of aluminum were treated with primer composition D and E, strips of Ealstomer IV about 1-2 mm. thick were manually pressed onto the primed surfaces, and the composite articles were heated in an oven at 200° F. for two hours. Even at this relatively low temperature, excellent adhesive bonds between the elastomer and the aluminum surface were obtained in both instances.

EXAMPLE 3

Following the procedures of Example 1, rectangular pieces of aluminum were treated with primer compositions D and E, strips of Elastomer III about 1-2 mm.

thick were manually pressed onto the primed surfaces, and the composite articles were heated in an oven at 400° F. for thirty minutes. Qualitative evaluation of the adhesive bonds (as in Example 1) showed that an excellent bond was obtained with primer composition D and a very good bond was obtained with primer composition E.

EXAMPLE 4

Following the procedures of Example 1, rectangular pieces of aluminum were treated with primer compositions D and E, strips of Elastomer I about 1-2 mm. thick were manually pressed onto the primed surfaces, and the composite articles were heated in an oven at 400° F. for thirty minutes. Qualitative evaluation of the adhesive bonds (as in Example 1) showed that adhesive bonds were obtained with primer compositions D and E, but these bonds were not as strong as the bonds obtained with Elastomer III in Example 3.

EXAMPLE 5

The surfaces of two slabs of butyl rubber were wiped with cloths saturated with primer compositions D and E, respectively, and strips of Elastomer IV about 1-2 mm. thick were manually pressed onto the primed surfaces. The composite articles were heated at 250° F. for thirty minutes. The adhesive bond obtained with primer E was very good and with primer D was excellent.

The composite articles were then heated for an additional three days at 250° F. The adhesive bond obtained with primer E was excellent while with primer D the bond was so strong that the polysiloxane elastomer could only be torn away in small pieces.

EXAMPLE 6

Primer composition D was wiped onto the surface of a strip of anodized steel, a strip of Elastomer IV about 1-2 mm. thick was manually pressed onto the primed surface, and the composite article was heated at 300° F. for thirty minutes. The adhesive bond between the elastomer and the steel surface was excellent.

EXAMPLE 7

Primer composition D was wiped onto the surface of a strip of nylon tape, a strip of Elastomer IV about 1-2 mm. thick was manually pressed onto the primed surface, and the composite article was heated at 300° F. for thirty minutes. The adhesive bond between the elastomer and the nylon tape was excellent.

EXAMPLE 8

Primer composition D was wiped onto the surface of a strip of Mylar (polyethylene terephthalate resin), a strip of Elastomer IV about 1-2 mm. thick was manually pressed onto the primed surface, and the composite article was heated at 200° F. for one hour. The adhesive bond between the elastomer and the Mylar surface was excellent.

When the composite article was heated for an additional hour at 450° F. the adhesive bond was so strong that the polysiloxane elastomer tore before being peeled free from the Mylar surface.

EXAMPLE 9

The following primer compositions were prepared by pouring together the components and shaking vigorously in a glass vessel to give a homogeneous mixture.

Primer composition: Vol. percent

F—
  Tetra-isopropyl titanate _____ 20
  Allyltriethoxysilane _____ 80
G—
  Tetra-isopropyl titanate _____ 10
  Allyltriethoxysilane _____ 90
H—
  Tetra-isopropyl titanate _____ 50
  Allyltriethoxysilane _____ 50

Following the procedures of Example 1, six rectangular specimens of aluminum and six rectangular specimens of steel were treated with prime compositions F, G and H, strips of cured polysiloxane elastomer about 1-2 mm. thick were manually pressed onto the primed surfaces, and the composite articles were heated at 325° F. for for thirty minutes. The various combinations of metal, primer compositions and elastomer are summarized in Tables 9-1 and 9-2.

TABLE 9-1

|  | Aluminum specimen | | | | | |
|---|---|---|---|---|---|---|
|  | 1 | 2 | 3 | 4 | 5 | 6 |
| Primer Composition | F | G | H | F | G | H |
| Elastomer | II | II | II | IV | IV | IV |

TABLE 9-2

|  | Steel specimen | | | | | |
|---|---|---|---|---|---|---|
|  | 1 | 2 | 3 | 4 | 5 | 6 |
| Primer specimen | F | G | H | F | G | H |
| Elastomer | II | II | II | IV | IV | IV |

The adhesive bonds obtained with Elastomer IV were excellent in all cases and the adhesive bonds obtained with Elastomer II were rated very good in all cases.

EXAMPLE 10

Results similar to those described in Example 9 can be obtained with the following primer compositions:

Primer composition: Vol. percent

I—
  Delta-aminobutylmethyldiethoxysilane ____ 50
  Dibutyltitanium diacetate _____ 50
J—
  Beta-cyanoethyltriethoxysilane _____ 50
  Tetra-butyl titanate _____ 50
K—
  N(beta - aminoethyl)-gamma-aminopropyl-
    trimethoxysilane _____ 50
  Tetrapropyl titanate _____ 50

EXAMPLE 11

The following primer compositions were prepared by adding the components to a glass vessel and shaking until a homogeneous mixture was obtained:

Primer composition: Vol. percent

L—
  Gamma-aminopropyltriethoxysilane _____ 50
  Tetra-isopropyl titanate _____ 50
M—
  Gamma-aminopropyltriethoxysilane _____ 33⅓
  Allyltriethoxysilane _____ 33⅓
  Tetra-isopropyl titanate _____ 33⅓

Following the procedures of Example 1 two rectangular specimens each of copper, aluminum and steel were treated with primer composition L and M, strips of cured polysiloxane elastomer about 1-2 mm. thick were manually pressed onto the primed surfaces, and the composite articles were heated at 350° F. for one hour. The various combinations of metal, primer composition and elastomer are summarized in Table 11-1.

TABLE 11-1

| | Copper Specimen | | Aluminum Specimen | | Steel Specimen | |
|---|---|---|---|---|---|---|
| | 1 | 2 | 1 | 2 | 1 | 2 |
| Primer Composition | L | M | L | M | L | M |
| Elastomer | IV | IV | IV | IV | IV | IV |

Very good adhesive bonds were obtained with both copper surfaces and good adhesive bonds were obtained with both aluminum and both steel surfaces.

The six composite articles were then heated at 480° F. for twenty-four hours. Excellent adhesive bonds were obtained in all cases.

The experiment described hereinabove in this example was repeated after primer compositions L and M had been allowed to stand for about sixty hours. After heating at 350° F. for one hour very good adhesive bonds were obtained with the copper and aluminum surfaces and a poor adhesive bond with the steel surfaces. After heating an additional twenty-four hours at 480° F., excellent adhesive bonds were obtained with the aluminum and steel surfaces, while the adhesive bonds with the copper surfaces were less strong due to some oxidation of the copper surfaces.

What is claimed is:

1. A primer composition which comprises from 25 to 90 volume percent of at least one silane represented by the formulas:

a)

$$H_2NC_bH_{2b}\overset{R_n}{\underset{|}{Si}}(OR')_{3-n}$$

wherein R is a monovalent hydrocarbon group containing from one to about twelve carbon atoms, R' is an alkyl group containing from one to about four carbon atoms, $b$ is an integer having a value from three to six, $n$ is an integer having a value from zero to one, and the amino group is separated from the silicon atom by at least three carbon atoms of the $C_bH_{2b}$ group;

(b)

$$NCC_dH_{2d}\overset{R_n}{\underset{|}{Si}}(OR')_{3-n}$$

wherein R, R' and $n$ have the meanings defined with reference to formula (a) hereinabove, $d$ is an integer having a value from 2 to 5, and the cyano group is separated from the silicon atom by at least two carbon atoms of the $C_dH_{2d}$ group;

(c)

$$R'O\overset{O}{\underset{||}{C}}-C_dH_{2d}\overset{R_n}{\underset{|}{Si}}(OR')_{3-n}$$

wherein R, R' and $n$ have the meanings defined with reference to formula (a) hereinabove, $d$ is an integer having a value from 2 to 5, and the carboalkoxy group $$R'O\overset{O}{\underset{||}{C}}-$$

is separated from the silicon atom by at least two carbon atoms of the $C_dH_{2d}$ group; and (d)

$$H_2NC_fH_{2f}\overset{H}{\underset{|}{N}}C_bH_{2b}\overset{R_n}{\underset{|}{Si}}(OR')_{3-n}$$

wherein R, R', $b$ and $n$ have the meanings defined with reference to formula (a) hereinabove, $f$ is an integer having a value from 2 to 6 and the secondary amine group is separated from the silicon atom by at least three carbon atoms of the $C_bH_{2b}$ group, and from 75 to 10 volume percent of at least one hydrolyzable titanium compound represented by the formula $R_mTi(OR^*)_{4-m}$, wherein R has the meaning defined with reference to formula (a) hereinabove, R* is selected from the class consisting of a hydrogen atom, an R group and an $$R\overset{O}{\underset{||}{C}}$$

group, and $m$ is an integer having a value from 0 to 3.

2. A primer composition in accordance with claim 1 wherein said silane and said hydrolyzable titanium compound are dissolved in a liquid organic solvent.

3. A primer composition which comprises from 25 to 90 volume percent of at least one silane represented by the formula $$H_2NC_bH_{2b}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, $n$ is in integer having a value from zero to 1, $b$ is an integer having a value from 3 to 6, and the amino group is separated from the silicon atom by at least three carbon atoms of the $C_bH_{2b}$ group, and from 75 to 10 volume percent of at least one titanium compound represented by the formula $Ti(OR'')_4$, wherein R'' is an alkyl group containing from one to about 12 carbon atoms.

4. A primer composition which comprises from 25 to 90 volume percent of at least one silane represented by the formula $$R'O\overset{O}{\underset{||}{C}}-C_dH_{2d}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, $n$ is an integer having a value from zero to 1, $d$ is an integer having a value from 2 to 5, and the carboalkoxy group $$R'O\overset{O}{\underset{||}{C}}-$$

is separated from the silicon atom by at least two carbon atoms of the $C_dH_{2d}$ group, and from 75 to 10 volume percent of at least one titanium compound represented by the formula $Ti(OR'')_4$, wherein R'' is an alkyl group containing from one to about 12 carbon atoms.

5. A primer composition which comprises about 50 volume percent tetra-isopropyl titanate and about 50 volume percent gamma-aminopropyltriethoxysilane.

6. A primer composition which comprises about 50 volume percent tetra-isopropyl titanate and about 50 volume percent gamma-carbethoxypropyltriethoxysilane.

7. A prime composition which comprises about 33⅓ volume percent tetra-isopropyl titanate and about 33⅓ volume percent allyltriethoxysilane and about 33⅓ volume percent gamma-aminopropyltriethoxysilane.

8. A process for bonding cured polysiloxane elastomers to solid materials which comprises (1) applying to the surface of said solid material a primer composition comprising from 25 to 90 volume percent of at least one silane represented by the formulas (a)

$$H_2NC_bH_{2b}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, $b$ is an integer having a value from 3 to 6, $n$ is an integer having a value from zero to 1, and the amino group is separated from the silicon atom by at least three carbon atoms of the $C_bH_{2b}$ group:

(b)

$$NCC_dH_{2d}\overset{R_n}{\underset{|}{Si}}(OR')_{3-n}$$

wherein R, R' and $n$ have the meanings defined with reference to formula (a) hereinabove, $d$ is an integer having a value from 2 to 5, and the cyano group is separated from the silicon atom by at least two carbon atoms of the $C_dH_{2d}$ group:

(c)

$$R'O\overset{O}{\underset{||}{C}}-C_dH_{2d}\overset{R_n}{\underset{|}{Si}}(OR')_{3-n}$$

wherein R, R' and $n$ have the meanings defined with reference to formula (a) hereinabove, $d$ is an integer having a value from 2 to 5, and the carboalkoxy group $$\text{R'O}\overset{\text{O}}{\underset{\|}{\text{C}}}-$$

is separated from the silicon atom by at least two carbon atoms of the $C_dH_{2d}$ group:

(d) $$CH_2=CHC_eH_{2e}\overset{R_n}{\underset{|}{Si}}(OR')_{3-n}$$

wherein R, R' and $n$ have the meanings defined with reference to formula (a) hereinabove, and $e$ is an integer having a value from zero to 4; and (e) $$H_2NC_fH_{2f}\overset{H}{\underset{|}{N}}C_bH_{2b}\overset{R_n}{\underset{|}{Si}}(OR')_{3-n}$$

wherein R, R', $b$ and $n$ have the meanings defined with reference to formula (a) hereinabove, $f$ is an integer having a value from 2 to 6 and the secondary amine group is separated from the silicon atom by at least three carbon atoms of the $C_bH_{2b}$ group, and from 75 to 10 volume percent of at least one hydrolyzable titanium compound represented by the formula $R_mTi(OR^*)_{4-m}$, wherein R has the meaning defined with reference to formula (a) hereinabove, $R^*$ is selected from the class consisting of a hydrogen atom, an R group and an $$\text{R}\overset{\text{O}}{\underset{\|}{\text{C}}}-$$

group, and $m$ is an integer having a value from 0 to 3, (2) contacting said cured elastomer with the primed surface and (3) heating said solid material-elastomer combination at a temperature of at least 150° F. until said elastomer becomes bonded to said primed surface.

9. A process in accordance with claim 8 wherein said silane and said hydrolyzable titanium compound are dissolved in a liquid organic solvent before application to said solid surface.

10. A process in accordance with claim 8 wherein said primed surface is dried at room temperature for at least about five minutes before said elastomer is contacted with said primed surface.

11. A process for bonding cured polysiloxane elastomers to solid materials which comprises (1) applying to the surface of said solid material a primer composition comprising from 25 to 90 volume percent of at least one silane represented by the formula $$H_2NC_bH_{2b}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, $n$ is an integer having a value from zero to 1, $b$ is an integer having a value from 3 to 6, and the amino group is separated from the silicon atom by at least three carbon atoms of the $C_bH_{2b}$ group, and from 75 to 10 volume percent of at least one titanium compound represented by the formula $Ti(OR'')_4$, wherein R'' is an alkyl group containing from one to about 12 carbon atoms, (2) contacting said cured elastomer with the primed surface and (3) heating said solid material-elastomer combination at a temperature of at least 150° F. until said elastomer becomes bonded to said primed surface.

12. A process for bonding cured polysiloxane elastomers to solid materials which comprises (1) applying to the surface of said solid material a primer composition comprising from 25 to 90 volume percent of at least one silane represented by the formula $$\text{R'O}\overset{\text{O}}{\underset{\|}{\text{C}}}-C_dH_{2d}\overset{R_n}{\underset{|}{Si}}(OR')_{3-n}$$

wherein R is a monovalent hydrocarbon group containing from one to about twelve carbon atoms, R' is an alkyl group containing from one to about 4 carbon atoms, $n$ is an integer having a value from zero to 1, $d$ is an integer having a value from 2 to 5, and the carboalkoxy group $$\text{R'O}\overset{\text{O}}{\underset{\|}{\text{C}}}-$$

is separated from the silicon atom by at least two carbon atoms of the $C_dH_{2d}$ group, and from 75 to 10 volume percent of at least one titanium compound represented by the formula $Ti(OR'')_4$, wherein R'' is an alkyl group containing from one to about 12 carbon atoms (2) contacting said cured elastomer with the primed surface and (3) heating said solid material-elastomer combination at a temperature of at least 150° F. until said elastomer becomes bonded to said primed surface.

13. A process for bonding cured polysiloxane elastomers to solid materials which comprises (1) applying to the surface of said solid material a primer composition comprising from 25 to 90 volume percent of at least one silane represented by the formula $$CH_2=CHC_eH_{2e}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, and $n$ is an integer having a value from zero to 1, $e$ is an integer having a value from zero to 4, and from 75 to 10 volume percent of at least one titanium compound represented by the formula $Ti(OR'')_4$, wherein R'' is an alkyl group containing from one to about 12 carbon atoms (2) contacting said cured elastomer with the primed surface and (3) heating said solid material-elastomer combination at a temperature of at least 150° F. until said elastomer becomes bonded to said primed surface.

14. A composite article which comprises a solid material and a cured polysiloxane elastomer adhesively bonded to a primed surface of said solid material, said adhesive bonding having been promoted by means of a primer composition applied to said surface, said primer composition comprising from 25 to 90 volume percent of at least one silane represented by the formulas (a) $$H_2NC_bH_{2b}\overset{R_n}{\underset{|}{Si}}(OR')_{3-n}$$

wherein R is a monovalent hydrocarbon group containing from one to about 12 carbon atoms, R' is an alkyl group containing from one to about 4 carbon atoms, $b$ is an integer having a value from 3 to 6, $n$ is an integer having a value from zero to 1, and the amino group is separated from the silicon atom by at least three carbon atoms of the $C_bH_{2b}$ group:

(b) $$NCC_dH_{2d}\overset{R_n}{\underset{|}{Si}}(OR')_{3-n}$$

wherein R, R' and $n$ have the meanings defined with reference to formula (a) hereinabove, $d$ is an integer having a value from 2 to 5, and the cyano group is separated from the silicon atom by at least two carbon atoms of the $C_dH_{2d}$ group:

(c) $$\text{R'O}\overset{\text{O}}{\underset{\|}{\text{C}}}-C_dH_{2d}\overset{R_n}{\underset{|}{Si}}(OR')_{3-n}$$

wherein R, R' and $n$ have the means defined with reference to formula (a) hereinabove, $d$ is an integer having a value from 2 to 5 and the carboalkoxy group $$\text{R'O}\overset{\text{O}}{\underset{\|}{\text{C}}}-$$

is separated from the silicon atom by at least two carbon atoms of the $C_dH_{2d}$ group:

(d) $$CH_2=CHC_eH_{2e}\overset{R_n}{\underset{|}{Si}}(OR')_{3-n}$$

wherein R, R' and $n$ have the meanings defined with reference to formula (a) hereinabove, and $e$ is an integer having a value from zero to 4:

(e) 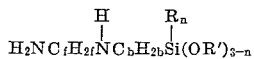

wherein R, R', $b$ and $n$ have the meanings defined with reference to formula (a) hereinabove, $f$ is an integer having a value from 2 to 6 and the secondary amine group is separated from the silicon atom by at least three carbon atoms of the $C_bH_{2b}$ group, and from 75 to 10 volume percent of at least one hydrolyzable titanium compound represented by the formula $R_mTi(OR^*)_{4-m}$, where R has the meaning defined with reference to formula (a) hereinabove, $R^*$ is selected from the class consisting of a hydrogen atom, an R group or an

group, and $m$ is an integer having a value from 0 to 3.

15. A process for bonding cured polysiloxane elastomers to aluminum which comprises (1) applying to a surface of said aluminum a primer composition comprising about 50 volume percent tetra-isopropyl titanate and about 50 volume percent allyltriethoxysilane, (2) contacting said cured elastomer with the primed surface, and (3) heating said aluminum-elastomer combination at a temperature of at least 150° F. until said elastomer becomes bonded to said primed surface.

16. A process for bonding cured polysiloxane elastomers to aluminum which comprises (1) applying to a surface of said aluminum a primer composition comprising about 50 volume percent tetra-isopropyl titanate and about 50 volume percent gamma-carbethoxypropyltriethoxysilane, (2) contacting said cured elastomer with the primed surface, and (3) heating said aluminum-elastomer combination at a temperature of at least 150° F. until said elastomer becomes bonded to said primed surface.

References Cited by the Examiner
UNITED STATES PATENTS 2,676,102  4/1954  Boyd et al. _____ 260—2

FOREIGN PATENTS 778,348  7/1957  Great Britain.

OTHER REFERENCES

Chemical Abstracts, vol. 54, col. 1376, (1960).

ALEXANDER WYMAN, *Primary Examiner.*

W. B. WALKER, M. A. LITMAN, *Assistant Examiners.*

UNITED STATES PATENT OFFICE
CERTIFICATE OF CORRECTION

Patent No. 3,321,350                          May 23, 1967

Frank Fekete

It is hereby certified that error appears in the above numbered patent requiring correction and that the said Letters Patent should read as corrected below.

Column 4, line 61, for "siloxanes" read -- silanes --; column 11, lines 14 and 15, the formula should appear as shown below instead of as in the patent:

Signed and sealed this 9th day of January 1968.

(SEAL)
Attest:

Edward M. Fletcher, Jr.

Attesting Officer

EDWARD J. BRENNER

Commissioner of Patents